United States Patent
Hosokawa

(10) Patent No.: US 9,961,634 B2
(45) Date of Patent: May 1, 2018

(54) RADIO RECEIVER AND MUTE CONTROL METHOD FOR THE SAME

(71) Applicant: ICOM INCORPORATED, Osaka (JP)

(72) Inventor: Keisuke Hosokawa, Osaka (JP)

(73) Assignee: ICOM INCORPORATED, Osaka (JP)

( * ) Notice: Subject to any disclaimer, the term of this patent is extended or adjusted under 35 U.S.C. 154(b) by 94 days.

(21) Appl. No.: 15/045,588

(22) Filed: Feb. 17, 2016

(65) Prior Publication Data

US 2016/0249305 A1    Aug. 25, 2016

(30) Foreign Application Priority Data

Feb. 19, 2015 (JP) ................................ 2015-030812

(51) Int. Cl.
*H04W 52/02* (2009.01)

(52) U.S. Cl.
CPC ......... *H04W 52/0216* (2013.01); *Y02D 70/00* (2018.01); *Y02D 70/164* (2018.01)

(58) Field of Classification Search
CPC . H04W 52/0216; Y02B 60/50; Y02D 70/164; Y02D 70/00
See application file for complete search history.

(56) References Cited

U.S. PATENT DOCUMENTS

2010/0124168 A1* 5/2010 Sakurai ............... H04B 7/2606
                                                           370/241
2016/0247505 A1* 8/2016 Adachi ................... H04L 69/22

FOREIGN PATENT DOCUMENTS

JP        2006-157477        6/2006

* cited by examiner

*Primary Examiner* — Tejis Daya
(74) *Attorney, Agent, or Firm* — Wenderoth, Lind & Ponack, L.L.P.

(57) ABSTRACT

A radio apparatus in which voice frames can be used for data transmission, which prevents abnormal sound and noise from occurring during fast data transmission. A controller of the radio apparatus determines whether the voice frames are being used for voice signal transmission or data transmission based on a result of identification of a mini-header that is stored in the data frames. The controller causes a voice signal reproduction unit to perform a muting operation when a result of the determination successively indicates that the voice frames are being used for data transmission a predetermined first number of times, and the controller causes the voice signal reproduction unit to cancel the muting operation when the result of the determination successively indicates that the voice frames are being used for voice signal transmission a predetermined second number of times in a situation where the muting operation is being performed.

7 Claims, 6 Drawing Sheets

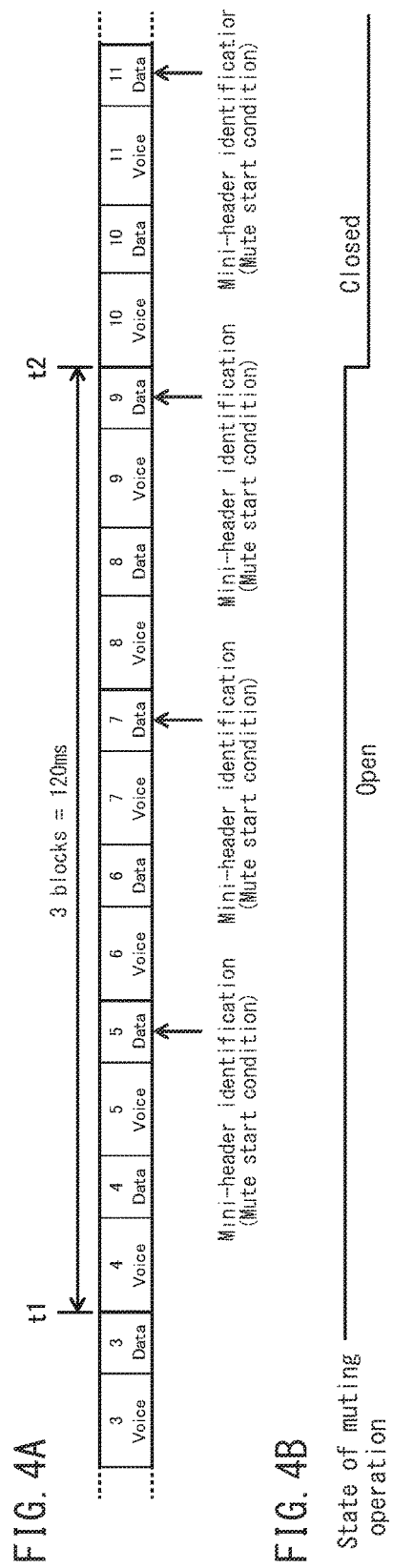

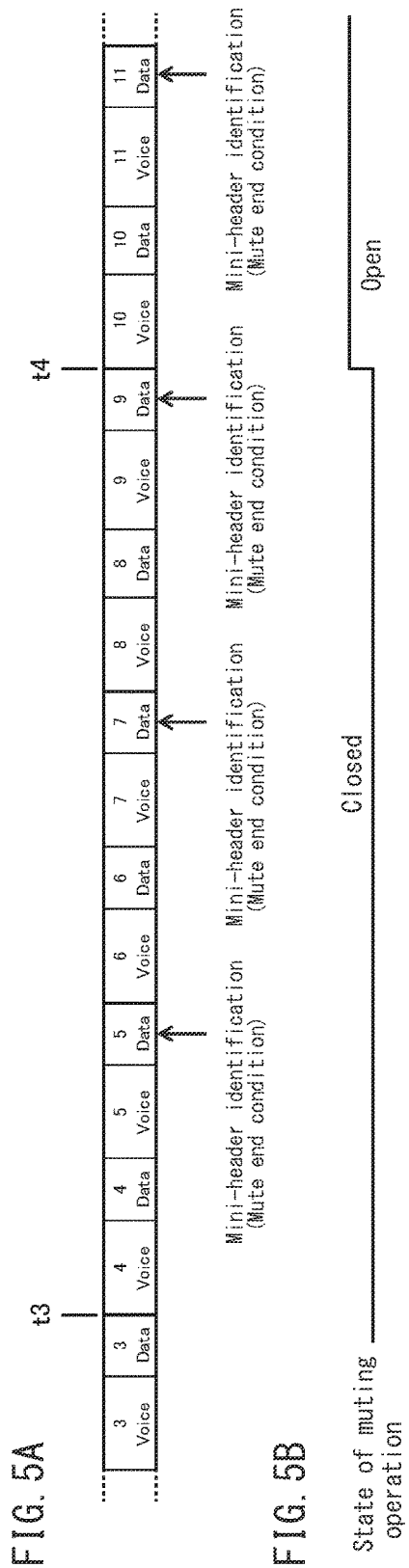

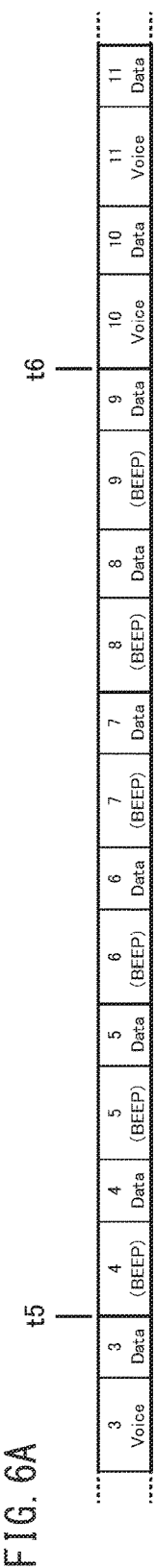
FIG. 6A
FIG. 6B State of muting operation

RADIO RECEIVER AND MUTE CONTROL METHOD FOR THE SAME

CROSS REFERENCE TO RELATED APPLICATIONS

The disclosure of Japanese Patent Application serial No. 2015-30812, filed on Feb. 19, 2015, including the specification, drawings and abstract is incorporated herein by reference in its entirety.

BACKGROUND OF THE INVENTION

Field of the Invention

The present invention relates to a radio receiver, and particularly to a mute control method that can be appropriately employed according to a standardized digitization technology for amateur radio.

Description of the Related Art

The standardized digitization technology for amateur radio (D-STAR: Digital Smart Technologies for Amateur Radio) proposed by the Japan Amateur Radio League aims to promote the digitization of amateur radio, and version 4.3 published in September 2004 indicates that, due to digitization, the convenience of amateur radio can be dramatically improved by transmitting not only voice, even though the main subject is voice, but also data.

When version 4.3 of the standardized digitization technology for amateur radio (hereinafter simply referred to as "the standardized technology") was published, data from personal computers and the like was envisaged as the aforementioned data. In recent years, however, radio apparatuses are equipped with a GPS receiver, and are used for exchanging their positional data. Also, due to the widespread use of smartphones, radio apparatuses are used for transmitting images captured by a smartphone from a mountainous area or the like that is outside the service range of the smartphone.

In order to support such data transmission, the applicant of the present invention proposed the invention disclosed in JP 2006-157477A. According to this invention, one piece of data is composed of two blocks, and a mini-header is embedded in the leading part of the first half of the piece of data so that multiple kinds of data can be identified.

In particular, in cases where image data is to be transmitted, the aforementioned standardized technology version 4.3 requires that voice frames always be transmitted even when no voice call is made, and accordingly the data transmission speed is approximately 950 bps, and it takes five minutes or longer to transmit a VGA size image. Hereinafter, this data transmission mode is referred to as the "slow data" mode, for the sake of convenience. Meanwhile, occasions of transmitting image data have rapidly increased, and accordingly data transmission that requires only a short period of time is demanded.

Considering the situation above, the inventors, etc., of the present invention proposed a scheme in which voice frames are also used for the transmission of data for data communication, and version 5.0 of the standardized digitization technology for amateur radio, which includes the details of the proposed scheme, was published in August 2014. According to this scheme, the transmission speed is increased to 3.6 kbps, which is approximately four times higher than previous. Hereinafter, this data transmission mode is referred to as the "fast data" mode, for the sake of convenience.

Prior to a description of the present invention, a description is given of a method for conversion (recombination) to the fast data according to version 5.0 of the standardized digitization technology for amateur radio, on which the present invention is based, with reference to FIG. 1.

First, when a call is generated, a bit sync B, a frame sync F, and a header H, which have predetermined sizes, are transmitted, and main data D, which includes voice frames, data frames, etc., is then transmitted. The frame period of the main data D is 420 msec, and, as shown in FIG. 1, the main data D is divided into ten blocks.

Each block is basically composed of pairs of a voice frame of 72 bits (9 bytes) and a data frame of 24 bits (3 bytes). These frames are combined in this order because, as described above, voice is the main subject. Only in the first block (block number 1), the first data frame is a sync signal. For this reason, the first block includes three pairs of a voice frame and a data frame. The following blocks, namely the second to tenth blocks, each include two pairs of a voice frame and a data frame.

The frame configuration is as described above. For the sake of convenience in treating the blocks as the fast data, a voice frame and a data frame in each block are combined such that a data frame comes first and is followed by a voice frame, as shown in detail in FIG. 1. This is for the purpose of checking the mini-header embedded in the leading part of the data, and distinguishing transmission of voice signal data alone, transmission of data for data communication alone, simplified transmission of voice signal data and data for data communication at the same time, and transmission of data for data communication utilizing voice frames as well, from each other.

Regarding the first frame, note that the first voice frame combined with the sync signal is relocated to the last part. The length in time of each pair of a voice frame and a data frame is 20 msec, and accordingly the frame period of the entire main data D is 60+40×9=420 msec, as described above. The first 8 bits (1 byte) of the data frames in the first half constitute the aforementioned mini-header, and the effective data length of the first block is 224 bits (28 bytes), and the effective data length of the second to tenth blocks is 160 bits (20 bytes), respectively.

The mini-header is 8 bits (1 byte) of data, and is represented as a two-digit hexadecimal. The first digit indicates the data type, and the second digit indicates the data length (or the block number). For example, according to the standardized technology version 5.0, the first digit is 3x and the second digit is 1 to 5 (bytes) in the case of simplified transmission by which data for data communication can be transmitted as well while voice signal data is transmitted, that is, in the case of slow data transmission.

The total data length of the two data frames is 48 bits (6 bytes), but since the mini-header occupies 8 bits (1 byte), the data is the remaining 1 to 5 bytes. On the other hand, in the case of transmission of data for data communication utilizing the voice frames as well, that is, in the case of fast data transmission, the first digit is 8x or 9x, and the second digit is 1 to F (1 to 15 bytes) or 0 to C (16 to 28 bytes).

Fast data transmission is enabled in this way. However, if the data of the mini-header is garbled, there are problems such as the voice frames not being recognized as including data for data communication, and being reproduced as voice, which causes abnormal sound or noise. Specifically, garbling is caused by the mini-header having a digit other than 8x or 9x, that is, having a digit from 0x to 7x or from Ax to Fx.

BRIEF SUMMARY OF THE INVENTION

The present invention relates to the aforementioned standardized technology version 5.0, and aims to provide a radio receiver and a mute control method for the same that are able to prevent abnormal sound or noise from occurring in the case where voice frames are used in high-speed data transmission. In a radio apparatus that has a fast data transmission mode in which voice frames can be used for data transmission, abnormal sound and noise is prevented from occurring during fast data transmission. Upon the radio apparatus receiving a radio signal that carries voice frames that contain voice signal data or data for data communication and data frames, the voice frames and the data frames having been subjected to time division multiplexing and being repeated one after another, a controller of the radio apparatus determines whether the voice frames are being used for voice signal transmission or data transmission based on a result of identification of a mini-header that is stored in the data frames. The controller causes a voice signal reproduction unit to perform a muting operation when a result of the determination successively indicates that the voice frames are being used for data transmission a predetermined first number of times, and the controller causes the voice signal reproduction unit to cancel the muting operation when the result of the determination successively indicates that the voice frames are being used for voice signal transmission a predetermined second number of times in a situation where the muting operation is being performed.

A radio receiver according to the present invention includes:

a reception unit configured to receive a radio signal that carries voice frames that contain voice signal data or data for data communication and data frames, the voice frames and the data frames having been subjected to time division multiplexing and being repeated one after another according to a predetermined format, and to retrieve and reproduce the voice signal data or the data for data communication from the voice frames;

a voice signal reproduction unit configured to decompress and apply D/A conversion to a digital voice signal that has been reproduced by the reception unit, thereby obtaining an analogue voice signal; and a controller configured to instruct the reception unit to retrieve the voice signal data or the data for data communication from the received radio signal, wherein the controller makes a determination as to whether the voice frames are being used for voice signal transmission or data transmission based on a result of identification of a mini-header that is stored in the data frames, the controller causes the voice signal reproduction unit to perform a muting operation when a result of the determination successively indicates that the voice frames are being used for data transmission a predetermined first number of times, and the controller causes the voice signal reproduction unit to cancel the muting operation when the result of the determination successively indicates that the voice frames are being used for voice signal transmission a predetermined second number of times in a situation where the muting operation is being performed.

A mute control method for a radio receiver according to the present invention is a mute control method for a radio receiver that includes: a reception unit configured to receive a radio signal that carries voice frames that contain voice signal data or data for data communication and data frames, the voice frames and the data frames having been subjected to time division multiplexing and being repeated one after another according to a predetermined format, and to retrieve and reproduce the voice signal data or the data for data communication from the voice frames; a voice signal reproduction unit configured to decompress and apply D/A conversion to a digital voice signal that has been reproduced by the reception unit, thereby obtaining an analogue voice signal; and a controller configured to instruct the reception unit to retrieve the voice signal data or the data for data communication from the received radio signal, the mute control method including the following steps that are performed by the controller:

a step of determining whether the voice frames are being used for voice signal transmission or data transmission based on a result of identification of a mini-header that is stored in the data frames;

a step of causing the voice signal reproduction unit to perform a muting operation when a result of the determination successively indicates that the voice frames are being used for data transmission a predetermined first number of times; and a step of causing the voice signal reproduction unit to cancel the muting operation when the result of the determination successively indicates that the voice frames are being used for voice signal transmission a predetermined second number of times in a situation where the muting operation is being performed.

According to the above-described configurations, in a radio receiver for receiving a signal that carries voice frames and data frames and is transmitted by time-division multiplexing according to a predetermined format as presented in the standardized digitization technology for amateur radio (D-STAR) for example, when enabling the voice frames to be used for high-speed data transmission by identification of a mini-header as presented in version 5.0 of the standardized technology for example in order to meet the demand for increasing transmission of data other than voice signal data, a new muting function is added to the voice signal reproduction unit in addition to a conventional muting function using a squelch or the like.

Specifically, the controller causes the voice signal reproduction unit to perform the muting operation when the result of the determination successively indicates that the voice frames are being used for data transmission a predetermined first number of times, whereas the controller causes the voice signal reproduction unit to cancel the muting operation when the result of the determination successively indicates that the voice frames are being used for voice signal transmission a predetermined second number of times in a situation where the muting operation is being performed.

If no measures are taken, garbled header data may result in abnormal sound or noise being reproduced from data for data communication due to misidentification. However, by taking the measures described above, it is possible to reliably suppress the occurrence of unnecessary abnormal sound and noise because the muting operation is performed during a period from when it has been successively determined that data transmission is being performed the first number of times to when it has been successively determined that data transmission is being stopped the second number of times.

These and other objects, features and advantages of the present invention will become more apparent upon reading of the following detailed description along with the accompanied drawings.

BRIEF DESCRIPTION OF THE DRAWINGS

FIG. 4A and FIG. 4B are timing charts illustrating a muting operation of a radio apparatus according to an embodiment of the present invention, performed in response to switching from slow data to fast data.

FIG. 5A and FIG. 5B are timing charts illustrating a mute cancelling operation of a radio apparatus according to an embodiment of the present invention, performed in response to switching from fast data to slow data.

FIG. 6A and FIG. 6B are timing charts illustrating a mute cancelling operation of a radio apparatus according to an embodiment of the present invention, performed in response to receiving beep sound data during a muting operation during transmission of the fast data.

DETAILED DESCRIPTION OF THE INVENTION

Figure 2:
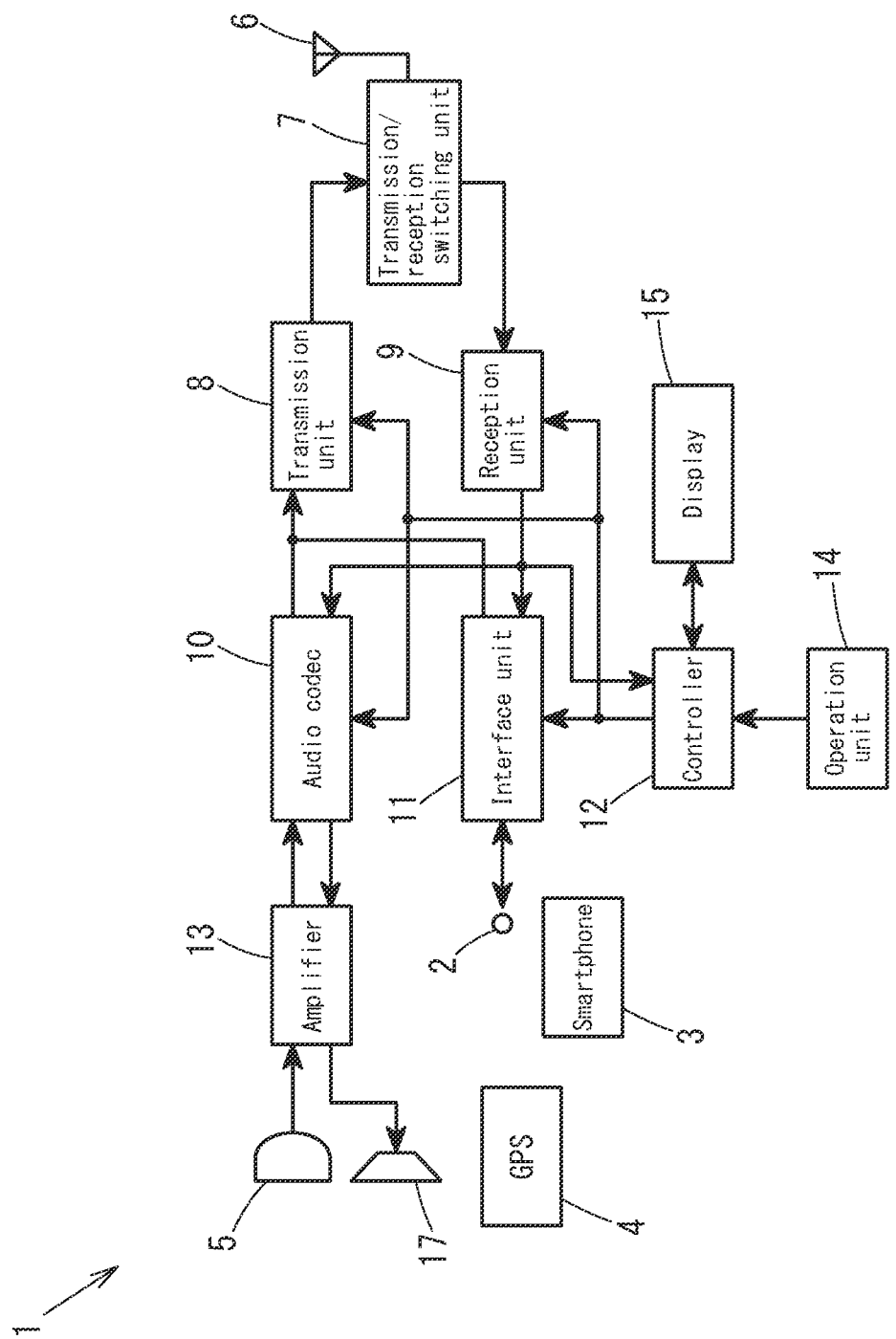
FIG. 2 is a block diagram showing an electrical configuration of a radio apparatus according to an embodiment of the present invention.

FIG. 2 is a block diagram showing an electrical configuration of a radio apparatus 1 according to an embodiment of the present invention. The radio apparatus 1 serves as a radio receiver, and complies with version 5.0 of the standardized digitization technology for amateur radio. The radio apparatus 1 is based on the aforementioned disclosure of JP 2006-157477A.

Figure 1:
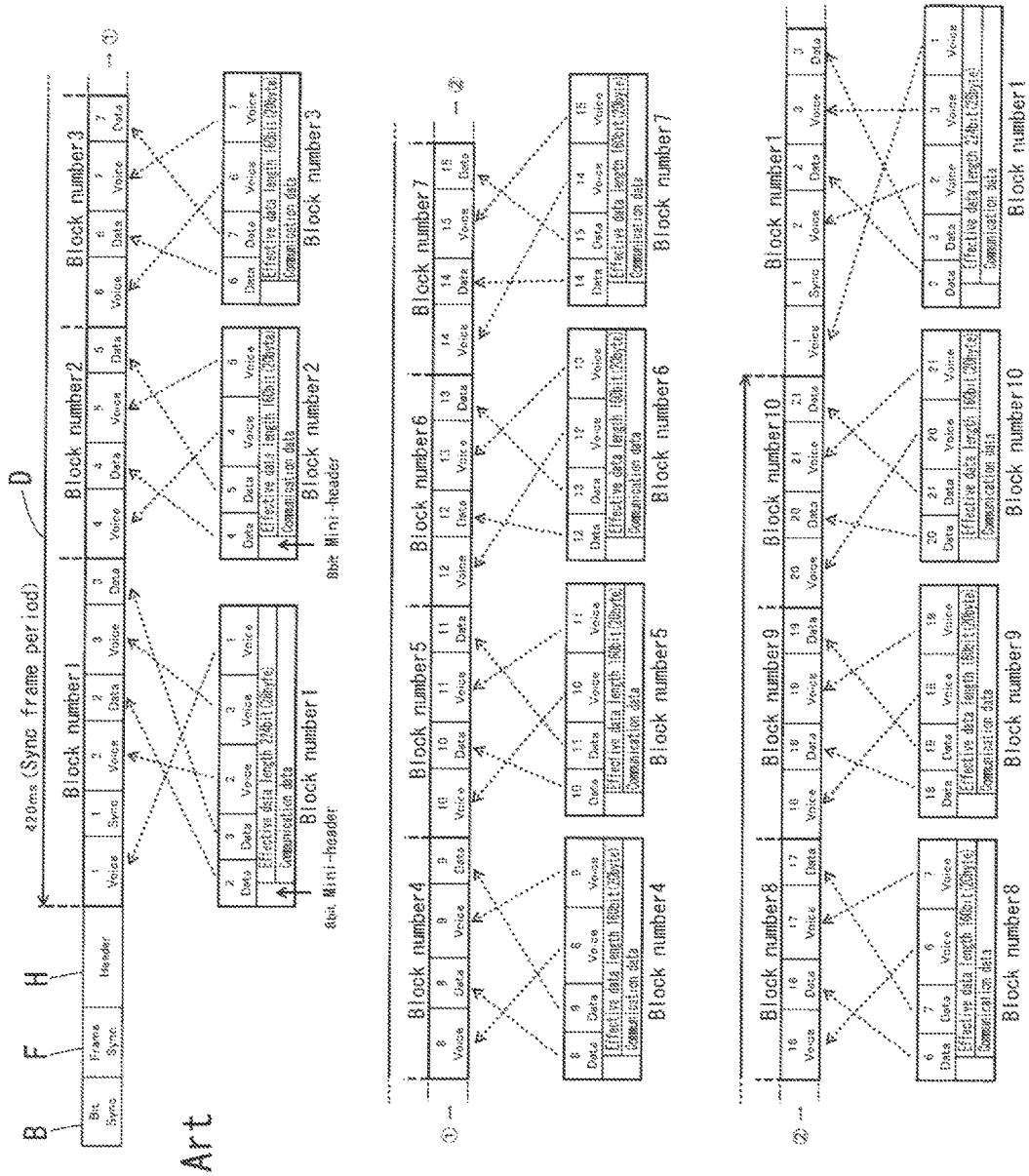
FIG. 1 is a diagram illustrating a format for fast data transmission presented in version 5.0 of the standardized digitization technology for amateur radio (D-STAR).

The radio apparatus 1 transmits data received from a smartphone 3, a GPS receiver 4, or the like, which are connected to a terminal 2, together with voice from a microphone 5, from an antenna 6 by time-division multiplexing according to the predetermined format shown in FIG. 1. Also, the radio apparatus 1 demultiplexes a received signal back into data for data communication directed to the smartphone 3, the GPS receiver 4, or the like, and voice signal data directed to a speaker 17, according to the format so that the data and the voice are output respectively. The smartphone 3 is externally connected to the radio apparatus 1 via a USB cable or the like, and the GPS receiver 4 is built into the radio apparatus 1.

The radio apparatus 1 includes the antenna 6, a transmission/reception switching unit 7, a transmission unit 8, a reception unit 9, an audio codec 10, an interface unit 11, a controller 12, an amplifier 13, the microphone 5, the speaker 17, an operation unit 14, and a display 15.

The operation unit 14 is provided for inputting conditional information used for operating the radio apparatus 1. The operation unit 14 is provided with various operation keys not shown in the drawings. When a user operates an operation key, the radio apparatus 1 is caused to perform an operation corresponding to the key input.

The operation keys also include an operation key for inputting identification information (ID) of the header H of communication frames as shown in FIG. 1. Furthermore, the operation keys include an operation key for performing an operation to input the number of data frames to be concatenated in order to form communication frames.

The display 15 displays various kinds of information related to operations performed by the radio apparatus 1. The display 15 displays the details of an input operation made by the user to the operation unit 14. The details of the input operation made to the operation unit 14 can thus be checked on the display 15. Furthermore, the display 15 displays whether the radio apparatus 1 is serving as a transmitter or a receiver. The display 15 also displays the ID (identification information) of the communication party radio apparatus that the radio apparatus 1 is communicating with. The display 15 also displays a message prompting the user to perform a certain input operation.

In the case where the radio apparatus 1 serves as a transmitter, the voice of the user is converted to a voice signal by the microphone 5, and the voice signal is input to and amplified by the amplifier 13 and then input to the audio codec 10. The audio codec 10 has an analogue-digital conversion function, which is the function of converting a voice signal between an analogue signal and a digital signal.

In the case where the radio apparatus 1 serves as a transmitter, the audio codec 10 converts an analogue voice signal to a digital voice signal, and outputs the digital voice signal to the transmission unit 8. In the case where the radio apparatus 1 serves as a transmitter, the audio codec 10 has a compression function, which is the function of compressing a voice signal that has been converted into a digital signal.

The transmission unit 8 has a modulation function, which is the function of modulating input voice signal data from the audio codec 10 and input data for data communication from the interface unit 11. According to the standardized digitization technology for amateur radio, the Gaussian filtered minimum shift keying (GMSK) modulation method is adopted as the method by which the transmission unit 8 modulates signals.

The GMSK modulation method is one digital modulation method that attempts to narrow the bandwidth by first passing a two-valued input signal through a filter called a Gaussian filter, and then performing frequency modulation.

The transmission unit 8 first converts the input voice signal data and data for data communication according to the format shown in FIG. 1, and then modulates the signals by GMSK modulation, converts the modulated signals to radio signals having the frequency (channel) set by the controller 12, amplifies the radio signals, and transmits the amplified signals from the antenna 6 to the communication party radio apparatus via the transmission/reception switching unit 7.

In the case where the radio apparatus 1 serves as a receiver, the radio apparatus 1 receives voice signal data of a call and data for data communication, which are transmitted from the communication party transmitter. The signals received by the antenna 6 are input to the reception unit 9 via the transmission/reception switching unit 7.

The reception unit 9 has a tuning function, which is the function of selecting and receiving a signal from a particular communication channel. The frequency band of the radio signals to be received is set to the reception unit 9. The signal that has undergone tuning by the reception unit 9 is first amplified and then undergoes GMSK demodulation. The data of the header H included in the communication frames of the signals demodulated by the reception unit 9 is input to the controller 12.

Based on the information (ID) of the header H, the controller 12 can determine whether or not the received signals are addressed to the radio apparatus 1. In the case where the received signals are normal, the controller 12 causes the reception unit 9 to receive the data following the header H and to sequentially process the data pieces in the main data D.

Voice signal data included in the voice frames of the main data D is output to the audio codec 10, and data for data communication included in the data frames is output to the interface unit 11.

In the case where the radio apparatus 1 serves as a receiver, the audio codec 10 serves as a voice signal reproduction unit, decompresses the compressed voice data, and reproduces an analogue voice signal from the digital signal obtained by decompression. The analogue voice signal thus reproduced is first amplified by the amplifier 13, and then output from the speaker 17. The radio apparatus 1 can thus receive voice communication addressed to the radio apparatus 1, and can also intercept voice communication from the same channel addressed to other stations.

On the other hand, data input to the interface unit 11 is output to the smartphone 3, the GPS receiver 4, etc., from the terminal 2. The radio apparatus 1 can thus receive data addressed to the radio apparatus 1, and can also receive data from the same channel addressed to other stations as necessary.

It is worth noting that in the radio apparatus 1 according to the present embodiment, the controller 12 references the mini-header when processing the main data D, and in the case where voice frames are being used for transmission of voice signals, that is, in the case where transmission is performed in a mode other than the fast data mode such as the slow data mode, the controller 12 outputs the voice signal data to the audio codec 10 as described above, whereas in the case where voice frames are being used for data transmission, that is, in the case where transmission is performed in the fast data mode, the controller 12 outputs the data to the interface unit 11, and causes the audio codec 10 to perform a muting operation.

Figure 3:
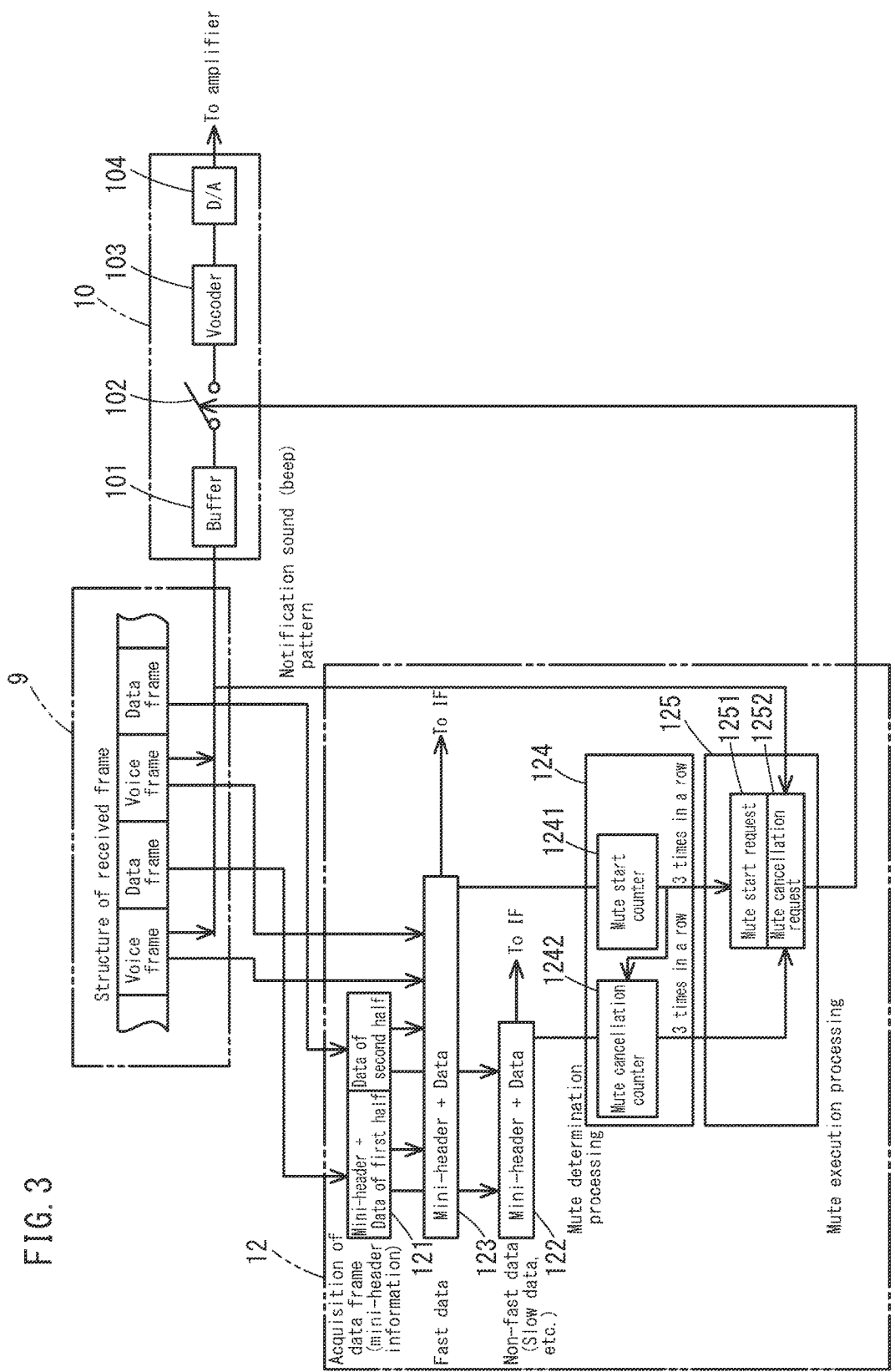
FIG. 3 is a functional block diagram illustrating a muting operation of the radio apparatus shown in FIG. 2.

FIG. 3 is a functional block diagram illustrating the muting operation. The constituent elements corresponding to those in FIG. 2 are given the same reference signs. In the case where the data of voice frames received by the reception unit 9 is determined as being a voice signal by the controller 12 based on the result of the identification of the mini-header, the data is input to the audio codec 10, and after a delay of a predetermined number of data frames (e.g., 1 to 2 frames) is performed in a buffer 101, the data is input to a vocoder 103 via a mute switch 102. The mute switch 102 is also used by a squelch or the like. The voice output from the speaker 17 becomes silent by releasing the mute switch 102. The vocoder 103 decodes input voice signal data, and the voice signal data thus decoded is converted to an analogue signal by a D/A conversion unit 104, and is output to the amplifier 13.

Meanwhile, the data of data frames received by the reception unit 9 is temporarily stored in a register 121 of the controller 12, and determinations as to, for example, whether the voice frames are being used for voice signal transmission or used for data transmission are made based on the mini-header. When voice frames are being used for voice signal transmission, block data is assembled in a register 122 from the data, which is the slow data, every aforementioned frame period of 420 msec as shown in FIG. 1. In the block data, two frames constitute one block. The block data is output from the interface unit 11 to the smartphone 3, the GPS receiver 4, or the like. Note that when there is no effective data, the slow data is filled with dummy data indicating redundancy, for example.

If it is determined that the voice frames are being used for data transmission based on the result of the identification of the mini-header, the data is combined in a register 123 with the data of data frames in the register 121, and fast data is edited to be block data every aforementioned frame period of 420 msec as shown in FIG. 1. The block data is output from the interface unit 11 to the smartphone 3, the GPS receiver 4, or the like.

In order to perform the muting operation, the controller 12 is provided with a mute determination processing unit 124 and a mute execution processing unit 125. The mute determination processing unit 124 includes a mute start counter 1241 and a mute cancellation counter 1242.

The mute start counter 1241 monitors the content of the mini-header in the register 123, which is the register used in the case of fast data. When the data has been successively determined to be fast data three times (a first number of times), and more specifically, when the first digit of the mini-header has been successively identified as 8x or 9x for a period of three blocks, which is a period of 120 msec, the mute start counter 1241 transmits a mute start request 1251 to the mute execution processing unit 125. Upon receiving the mute start request 1251, the mute execution processing unit 125 enables the muting operation by releasing the mute switch 102.

This operation is shown in FIG. 4A and FIG. 4B. FIG. 4A shows the main data D of received data, and FIG. 4B shows the state of the muting operation. In FIG. 4A, switching to fast data takes place at time t1, and, as shown in FIG. 4B, the muting operation is performed from time t2, which is a period of three blocks after t1, i.e., 120 msec after t1. In FIG. 4B, the "open" state of the muting operation indicates that the mute switch 102 is conductive and voice is output, and the "closed" state of the muting operation indicates that the mute switch 102 is released and the muting operation is performed.

Meanwhile, the mute cancellation counter 1242 is reset in response to the mute start request 1251 from the mute start counter 1241, so that the mute cancellation counter 1242 can perform a counting operation. Accordingly, the mute cancellation counter 1242 monitors the content of the mini-header in the register 122, which is the register used in the case of slow data. When the data has been successively determined to be the slow data three times (a second number of times), and more specifically, when the first digit of the mini-header has been successively identified as a digit other than 8x or 9x (e.g., 3x) for a period of three blocks, which is a period of 120 msec, the mute cancellation counter 1242 transmits a mute cancellation request 1252 to the mute execution processing unit 125.

Upon receiving this mute cancellation request 1252, the mute execution processing unit 125 makes the mute switch 102 conductive to cancel the muting operation, and maintains the conductive state until the next mute start request 1251 occurs next time.

This operation is shown in FIG. 5A and FIG. 5B in the same manner as in FIG. 4A and FIG. 4B. FIG. 5A shows the main data D of received data, and FIG. 5B shows the state of the muting operation. In FIG. 5A, transmission of the fast data has been performed until the previous frame. Switching to the slow data takes place at time t3, and, as shown in FIG. 5B, the muting operation is cancelled at time t4, which is a period of three blocks after t3, i.e., 120 msec after t3.

According to version 5.0 of the standardized digitization technology for amateur radio, when voice frames are being used for data transmission, in other words, during fast data transmission, data of beep sound, which indicates that data transmission is being performed, is inserted into the voice frames every 1 sec, which is a predetermined period.

Therefore, when a beep sound pattern is detected from the data of a voice frame, the mute execution processing unit 125 generates the mute cancellation request 1252, and immediately makes the mute switch 102 conductive so as to cancel the muting operation.

Note that dummy sound indicating that data transmission is being performed is not limited to a beep sound, and may be a synthetic voice, for example. However, if the data length of the dummy sound is increased, the amount of data other than voice that can be transmitted will be relatively small. Therefore, a beep sound, which can be recognized in a short period of time, is preferable.

This operation is shown in FIG. 6A and FIG. 6B in the same manner as in FIG. 4A, FIG. 4B, FIG. 5A, and FIG. 5B. FIG. 6A shows the main data D of received data, and FIG. 6B shows the state of the muting operation. In FIG. 6A, during transmission of fast data, beep sound insertion is started and the muting operation is cancelled at time t5. As shown in FIG. 6B, fast data transmission is resumed at time t6, which is a period of three blocks after t5, i.e., 120 msec after t5, and the muted state is resumed.

As described above, in the radio apparatus 1 according to the present embodiment, when enabling voice frames as well to be used to transmit fast data as presented in version 5.0 of the standardized digitization technology for amateur radio by identification using the mini-header, the mute execution processing unit 125 releases the mute switch 102 so as to perform the muting operation when the mute start counter 1241 in the mute determination processing unit 124 indicates that the result of the determination successively indicates that the voice frames are being used for data transmission the first number of times, whereas the mute execution processing unit 125 makes the mute switch 102 conductive so as to cancel the muting operation when the mute cancellation counter 1242 in the mute determination processing unit 124 indicates that the result of the determination successively indicates that the voice frames are being used for voice signal transmission the second number of times in the situation where the muting operation is being performed.

If no measures are taken, garbled header data may lead to abnormal sound or noise being reproduced due to misidentification. However, by taking the measures described above, it is possible to reliably suppress the occurrence of unnecessary abnormal sound and noise because the muting operation is performed during a period from when the data has been successively determined to be the fast data the first number of times (i.e., from time t2 in FIG. 4A) to when the data has been successively determined to be the slow data the second number of times (i.e., until time t4 in FIG. 5A).

Also, the radio apparatus 1 according to the present embodiment employs the format defined in the standardized technology version 5.0, in which voice frames and data frames are repeated one after the other every 20 msec, the mini-header is used as the header, and the first number of times is three times. Accordingly, the muting operation is started when the data has been successively identified as the fast data for a period of three blocks, which is a period of 120 msec. As a result, even if abnormal sound or noise occurs, it is possible to suppress leakage of abnormal sound and noise to a minimum, and the determination as to whether or not switching to the fast data has taken place can be performed with a relatively high degree of accuracy.

Note that in the radio apparatus 1 according to the present embodiment, the buffer 101 is inserted upstream of the mute switch 102. Therefore, by setting the delay time caused by the buffer 101 to be a period of three blocks for fast data determination, which is a period of 120 msec, it is possible to completely prevent abnormal sound and noise from being heard.

However, the time until voice is actually reproduced increases as this delay time increases, and the length of an interval in a call increases in addition to the original delay time due to digitization. Therefore, the delay time of the buffer 101 is appropriately determined. According to the standardized technology version 5.0, the frame period is 20 msec, and the determination is made three times, which corresponds to 120 msec. However, if the frame period is different, the number of times the determination is made may be determined so as to correspond to 0.1 sec to 0.2 sec, balancing the degree of determination accuracy and the prevention of abnormal sound and noise from being heard.

On the other hand, in the same manner as in the case of muting, the muting operation is cancelled when switching from the fast data to the slow data takes place and a period of three blocks has elapsed, which is a period of 120 msec. Therefore, even while voice is being generated, it is possible to suppress the truncation of the beginning of the voice to a minimum, and the determination as to whether or not switching to the slow data has taken place can be performed with a relatively high degree of accuracy.

According to the standardized technology version 5.0, voice reproduced while fast data transmission is being performed becomes silent. Considering this situation, the data of beep sound, which is a dummy sound indicating that fast data transmission is performed, is inserted into voice frames every 1 sec. Accordingly, the mute execution processing unit 125, upon detecting the beep sound data, immediately cancels the muting operation of the mute switch 102.

As a result, there are no cases of the time until the completion of transmission being undesirably extended due to, for example, the recipient making an unnecessary call (or a return call) during fast data transmission, which causes a data collision and necessitates the sender to re-send the data.

The following summarizes preferable examples of the embodiment of the present invention. The radio receiver according to the present invention may be characterized in that, according to the above-described format, a bit sync, a frame sync, and the header are first transmitted and main data is thereafter transmitted, and in the main data: the voice frames and the data frames are repeated one after another; every two data frames constitute a block; a mini-header is inserted into data of a first half of the block; and the mini-header is used as the header.

Preferably, according to the above-described format, a pair of a voice frame and a data frame is repeated every 20 msec, and the first number of times is three times.

Preferably, according to the above-described format, a pair of a voice frame and a data frame is repeated every 20 msec, and the second number of times is three times.

With the above-described configurations, according to version 5.0 of the standardized digitization technology for amateur radio, a pair of a voice frame and a data frame is repeated every 20 msec, every two data frames constitute a block, and the mini-header is inserted into data of the leading part of the first half of the block.

Therefore, the muting operation is performed when the header is successively identified as indicating that data transmission is being performed, for a period of three blocks, i.e., 120 msec. As a result, even if abnormal sound or noise occurs, it is possible to suppress leakage of abnormal sound and noise to a minimum, and the determination as to whether or not data transmission is being performed can be performed with a relatively high degree of accuracy.

Similarly, the muting operation is cancelled when the header is successively identified as indicating that data transmission has been stopped, for a period of three blocks, i.e., 120 msec. Therefore, even while voice is being generated, it is possible to suppress the truncation of the beginning of the voice to a minimum, and the determination as to whether or not data transmission has been stopped can be performed with a relatively high degree of accuracy.

Also, in the radio receiver according to the present invention, in a case where the voice frames are being used for data transmission, dummy sound data indicating that data transmission is being performed is inserted into the voice frames at predetermined intervals, and the controller immediately causes the voice signal reproduction unit to cancel the muting operation upon determining that the dummy sound data is inserted in the voice frames.

With the above-described configuration, the output from the voice system becomes silent when data transmission utilizing voice frames as well is started. Considering this situation, dummy sound indicating that data transmission is being performed, for example a beep sound as presented in version 5.0 of the standardized digitization technology is inserted at predetermined intervals. As a result, there are no cases of the time until the completion of transmission being undesirably extended due to, for example, the recipient making an unnecessary call (or a return call), which causes a data collision and necessitates the sender to re-send the data.

Although the present invention has been fully described by way of example with reference to the accompanied drawings, it is to be understood that various changes and modifications will be apparent to those skilled in the art.

Therefore, unless otherwise such changes and modifications from the scope of the present invention hereinafter defined, they should be construed as being included therein.

What is claimed is:

1. A radio receiver, comprising:
a signal receiver configured to:
receive a radio signal that carries (i) voice frames that contain voice signal data or data for data communication and (ii) data frames, the voice frames and the data frames having been subjected to time division multiplexing and being repeated one after another according to a predetermined format; and
retrieve and reproduce the voice signal data or the data for data communication from the voice frames;
an audio codec configured to:
perform decompression of the voice signal data reproduced by the signal receiver; and
apply D/A conversion to a digital voice signal that has been obtained from the decompression, thereby obtaining an analogue voice signal; and
a controller configured to instruct the signal receiver to retrieve the voice signal data or the data for data communication from the radio signal,
wherein the controller makes a determination of whether the voice frames are being used for voice signal transmission or data transmission, based on a result of identification of a mini-header that is stored in the data frames,
the controller causes the audio codec to perform a muting operation when a result of the determination successively indicates that the voice frames are being used for data transmission a predetermined first number of times, and
the controller causes the audio codec to cancel the muting operation when the result of the determination successively indicates that the voice frames are being used for voice signal transmission a predetermined second number of times in a situation where the muting operation is being performed.

2. The radio receiver according to claim 1,
wherein, according to the predetermined format, a bit sync, a frame sync, and a header are first transmitted, and main data, in which the voice frames and the data frames are repeated one after another, is thereafter transmitted, and
in the main data, every two data frames constitute a block, and the mini-header is stored in a leading part of a data frame in a fast half.

3. The radio receiver according to claim 2,
wherein, according to the predetermined format, a pair of a voice frame and a data frame is repeated every 20 msec, and the predetermined first number of times is three times.

4. The radio receiver according to claim 2,
wherein, according to the predetermined format, a pair of a voice frame and a data frame is repeated every 20 msec, and the predetermined second number of times is three times.

5. The radio receiver according to claim 1,
wherein, in a case where the voice frames are being used for data transmission, dummy sound data indicating that data transmission is being performed is inserted in the voice frames at predetermined intervals, and
the controller immediately causes the audio codec to cancel the muting operation upon determining that dummy sound data is inserted in the voice frames.

6. A mute control method for a radio receiver that includes: a signal receiver configured to receive a radio signal that carries (i) voice frames that contain voice signal data or data for data communication and (ii) data frames, the voice frames and the data frames having been subjected to time division multiplexing and being repeated one after another according to a predetermined format, and to retrieve and reproduce the voice signal data or the data for data communication from the voice frames; an audio codec configured to perform decompression of the voice signal data reproduced by the signal receiver and apply D/A conversion to a digital voice signal that has been obtained from the decompression, thereby obtaining an analogue voice signal; and a controller configured to instruct the signal receiver to retrieve the voice signal data or the data for data communication from the received radio signal, the mute control method comprising the following steps that are performed by the controller;
a step of making a determination as to whether the voice frames are being used for voice signal transmission or data transmission based on a result of identification of a mini-header that is stored in the data frames;
a step of causing the audio codec to perform a muting operation when a result of the determination successively indicates that the voice frames are being used for data transmission a predetermined first number of times; and
a step of causing the audio codec to cancel the muting operation when the result of the determination successively indicates that the voice frames are being used for voice signal transmission a predetermined second number of times in a situation where the muting operation is being performed.

7. The mute control method according to claim 6,
wherein, in a case where the voice frames are being used for data transmission, dummy sound data indicating that data transmission is being performed is inserted in the voice frames at predetermined intervals, and the mute control method further comprises a step of immediately causing the audio codec to cancel the muting operation upon determining that dummy sound data is inserted in the voice frames.

\* \* \* \* \*